US012647297B2

(12) United States Patent
Jahner et al.

(10) Patent No.: US 12,647,297 B2
(45) Date of Patent: Jun. 2, 2026

(54) WIRELESS COMMUNICATION WITH A DOMESTIC APPLIANCE

(71) Applicant: BSH Hausgeräte GmbH, Munich (DE)

(72) Inventors: Matthias Jahner, Waging am See (DE); Christoph Söllner, Munich (DE); Jürgen Tschögl, Moosburg (DE)

(73) Assignee: BSH Hausgeräte GmbH, Munich (DE)

( * ) Notice: Subject to any disclaimer, the term of this patent is extended or adjusted under 35 U.S.C. 154(b) by 301 days.

(21) Appl. No.: 18/554,056

(22) PCT Filed: Apr. 27, 2022

(86) PCT No.: PCT/EP2022/061154
§ 371 (c)(1),
(2) Date: Oct. 5, 2023

(87) PCT Pub. No.: WO2022/233665
PCT Pub. Date: Nov. 10, 2022

(65) Prior Publication Data
US 2024/0214240 A1 Jun. 27, 2024

(30) Foreign Application Priority Data

May 4, 2021 (DE) ..................... 10 2021 204 490.5

(51) Int. Cl.
*H04L 12/28* (2006.01)
*H04W 76/10* (2018.01)
*H04W 88/16* (2009.01)

(52) U.S. Cl.
CPC ......... *H04L 12/2838* (2013.01); *H04W 76/10* (2018.02); *H04L 2012/2841* (2013.01); *H04L 2012/285* (2013.01); *H04W 88/16* (2013.01)

(58) Field of Classification Search
CPC ......... H04L 12/2838; H04L 2012/2841; H04L 2012/285; H04W 76/10
See application file for complete search history.

(56) References Cited

U.S. PATENT DOCUMENTS

2003/0087629 A1* 5/2003 Juitt .................... H04W 12/068
455/411
2016/0094402 A1* 3/2016 Finkelstein ........... H04L 41/022
709/226

(Continued)

FOREIGN PATENT DOCUMENTS

EP 3723060 A1 10/2020
KR 100749674 B1 * 8/2007 ............ H04W 80/06

OTHER PUBLICATIONS

Anonymous, "Handover—Wikipedia—Version from Apr. 2, 2021", Apr. 2, 2021 (Apr. 2, 2021), Retrieved from: URL:https://de.wikipedia.org/w/index.php?title=Handover&oldid=210481774 XP055975882 [found on Oct. 28, 2022], the whole document.

*Primary Examiner* — Joseph A Bednash
(74) *Attorney, Agent, or Firm* — Laurence A. Greenberg; Werner H. Stemer; Ralph E. Locher

(57) ABSTRACT

A method for wireless communication with a domestic appliance includes the following steps: transmitting radio signals by way of the domestic appliance; receiving the transmitted radio signals by way of multiple gateways; ascertaining an indication of a quality of the received radio signals by each gateway; transferring the indications to the central location; selecting one of the gateways based on the indications; and setting up a wireless communication connection between the domestic appliance and the selected gateway.

12 Claims, 2 Drawing Sheets

(56)        References Cited

U.S. PATENT DOCUMENTS

2017/0171806  A1      6/2017  Sachs et al.
2019/0349252  A1 *  11/2019  Hu  ..................... H04L 41/0895

* cited by examiner

WIRELESS COMMUNICATION WITH A DOMESTIC APPLIANCE

FIELD AND BACKGROUND OF THE INVENTION

The invention relates to wireless communication between a household appliance and a remote location. In particular the invention relates to the establishment of the wireless communication.

A household appliance, for example an oven or extractor hood, is designed to communicate with a remote location. The remote location can hold information, requests or pre-settings for the household appliance or can receive and further process information from the household appliance.

Communication generally takes place by way of a wireless gateway, usually located in the same household as the household appliance. For example the household appliance can communicate wirelessly by WLAN with the gateway, which then provides wire-based communication with the remote location, for example by way of a household DSL connection.

The wireless connection may not be adequate from every point in the household. Some wireless communication methods, for example certain Bluetooth variants, only have a short range, so communication with the gateway may be unreliable. The household appliance may move about in the household, so the wireless connection may experience fluctuating quality. Also people or moving objects may have a negative effect on the quality of the wireless connection.

SUMMARY OF THE INVENTION

One object of the present invention is to specify an improved technique for establishing a connection between a household appliance and a central location using an economical and flexible wireless communication connection. The invention achieves this object by means of the subject matter of the independent claims. Preferred embodiments are set out in the subclaims.

According to a first aspect of the present invention, a method for wireless communication with a household appliance comprises steps of transmitting radio signals by way of the household appliance; receiving the transmitted radio signals by way of multiple gateways; determining an indication of a quality of the received radio signals by way of each gateway; transferring the indications to the central location; selecting one of the gateways on the basis of the indications; and setting up a wireless communication connection between the household appliance and the selected gateway.

The household appliance may be located in the same household as the gateways, it being possible for the gateways to be arranged in different places in the household. The household appliance can be operated in a movable manner, for example in the case of a mixer, a food processor or a toaster. The household appliance can also be operated in a variety of usage locations, for example in the case of a fan heater, a battery charger or a work lamp. In yet another embodiment the household appliance can also be set up in a selected location in the household and left there, for example in the case of a dishwasher or cooker. The quality of wireless connection that can be achieved between the household appliance and a gateway can be a function of the positions of the two communication partners or external influences, for example the operation of another wireless appliance or the position of an object in a Fresnel zone around the partner.

The wireless connection for the household appliance can be set up to the gateway that allows the best communication. The indication can comprise for example a usable bandwidth, a number of data packets sent without errors per unit of time, an analog signal strength, a signal to noise ratio (SNR) or a number of usable frequency channels. In one embodiment each gateway determines a numerical value for communication quality based on one or more criteria so that the numerical values determined can be compared directly with one another.

The gateways can communicate with the central location by way of a partially or fully wired connection. For example a first gateway can be connected in a wired manner to a household internet connection and a second gateway by means of mobile radio. The central location can also be connected to the internet.

The central location is generally located outside the household and can be designed to communicate with a plurality of household appliances assigned to the same or different households. However an embodiment is also conceivable in which the central location is located in the household. The central location here can correspond to a gateway or be integrated therein.

A communication connection that operates by way of the selected gateway is preferably set up between the household appliance and the central location. The communication connection between the household appliance and the central location here comprises the wireless communication connection between the household appliance and the gateway. For the connection to the central location, the gateway by way of which it operates may be insignificant. However the gateway may be selected so that certain connection parameters, such as communication security or communication speed are optimized. Error-free communication between the household appliance and the central location can be ensured at connection level, for example by means of datagrams and confirmed transmission, in particular by TCP.

The communication connection between the household appliance and the central location can be encrypted. End to end encryption preferably takes place here so that the content of the communication cannot be monitored by the gateway. Encryption can be based on an established communication connection and be implemented for example by means of dTLS or a similar technique. This ensures that transferred data is better protected. A gateway may not be involved in encryption, thereby reducing the secure distribution of cryptographic keys or certificates to the gateways.

The central location can also determine the gateway based on information relating to the gateways. For example a first gateway, which is activated temporarily, can be arranged in a further household and a second gateway, which is activated permanently, can be arranged in the same household as the household appliance. In this instance the second gateway may allow a more advantageous connection than the first. Criteria for selecting a gateway can comprise its availability over time, communication-related costs or reliability of the gateway.

Corresponding information can be transferred from the gateway to the central location or the central location holds such information relating to multiple individual gateways and one gateway is identified during communication relative to the central location. The manner in which the central location weights individual items of information when selecting a gateway can be adapted in a flexible manner.

Even after the wireless communication connection has been set up, the gateways can continue to receive radio signals from the household appliance, determine an indication of their quality in each case and forward it to the central location. The household appliance can continue to transmit radio signals accordingly or radio signals from the gateways can be evaluated, having been transmitted in the context of communication between the household appliance and the selected gateway. If the connection by way of the selected gateway fails, for example because the gateway is deactivated, a new gateway can be selected on the basis of already known quality data, it being possible for a good communication connection then to be set up quickly thereto.

The central location can also select another gateway based on the received indications; the existing wireless communication connection can then be terminated; and a wireless communication connection to the other gateway can be set up. This allows the communication connection always to be established dynamically by way of the gateway offering the best wireless connection to the household appliance. End to end encryption does not have to be affected by a change of communication connection, so for example new authentication of the communication partners is not required.

It is generally preferable for a stateless protocol to be used between the household appliance and the central location. For example a REST (Representational State Transfer) interface can be used, as known from the software architecture for distributed systems, in particular for web services. The stateless connection can remain unaffected, in particular when the underlying communication connection changes, with one gateway being replaced by another.

The wireless communication connection between the household appliance and the gateway can be established by means of Bluetooth and preferably by means of Bluetooth Low Energy (BTLE). Such technologies do not allow a wireless connection to be set up from a household appliance to different gateways at the same time, so comparable quality parameters cannot be determined for such connections. Also the household appliance itself can offer server services, which can only be delivered to one communication partner at any time. In one embodiment the household appliance can only be available to establish a wireless connection, but not any gateways.

According to a further aspect of the present invention a gateway comprises a wireless communication interface and a further communication interface for connection to a central location; the gateway being designed to receive radio signals from a household appliance; to determine an indication of a quality of the received radio signals and transfer it to the central location; to receive a request from the central location in response to the transferred indication; and to set up a wireless communication connection to the household appliance. The request can ask for the setting up of the wireless communication connection. In a further development a request can also be received, which asks for a wireless communication not to be set up or to be terminated. The gateway is preferably designed also to comply with such a request.

The gateway in turn can itself be part of a further household appliance, in particular a large household appliance. Such a further household appliance can also be referred to as a gateway household appliance. This is because the provision of connectivity can be associated with not insignificant costs, a Bluetooth module being more economical for example than a Wi-Fi module with regard to hardware and patent licenses. It may therefore be advisable only to incorporate Wi-Fi modules in large household appliances, as their basic price is such that the consumer will accept the additional costs of the Wi-Fi module. In the case of small household appliances, such as stick blenders, toasters, mixers and electric can openers, the price of a Wi-Fi module would presumably be so high and the associated additional consumer benefit so small that the consumer would prefer to purchase a non-networked small household appliance. An intermediate solution may be to equip small household appliances with an economical Bluetooth module. As these generally tend to be used in the kitchen, it is likely that they can connect to a large household appliance that has a combined Bluetooth and Wi-Fi module that can operate as a gateway in order thus to be part of the networked household system. Large household appliances in particular include ovens, cookers, extractor hoods, refrigerators, dishwashers and washing machines. This allows small household appliances to be integrated economically into a networked household system, a connection to a central location, for example an internet server, being established by way of a gateway, which can in turn be part of a further household appliance, for example a large household appliance. This can offer a good balance between connectivity and the cost efficiency of different household appliances.

According to yet another aspect of the present invention a system comprises a household appliance, which is designed to transmit and receive radio signals; one or multiple gateways described herein; and a central location, which is designed to receive indications of the quality of a radio signal received from the household appliance from each gateway and to select one of the gateways on the basis of the indications. The household appliance and at least some of the gateways can be arranged in the same household. The central location is preferably designed to transfer a request to the selected gateway to set up a wireless communication connection to the household appliance. In a further embodiment requests not to set up a wireless connection can be transferred from the central location to all the gateways not selected.

A gateway, the household appliance and/or the central location can each be designed to carry out all or part of a method described herein. To this end the corresponding appliance can comprise a programmable microcomputer or microcontroller and the method or a part thereof can be available in the form of a computer program product with program code means. The computer program product can be stored on a computer-readable data medium. Features or advantages of the method can be transferred to each of the appliances or the system or vice versa.

In one particularly preferred embodiment the described method is a method for wireless communication for a small household appliance, which only has a Bluetooth module but no Wi-Fi module, with a central server on the internet for example. According to the method radio signals can be transmitted by the small household appliance. The transmitted radio signals are received by way of multiple gateways, which are preferably each part of a large household appliance. Each gateway has for example a combined Bluetooth and Wi-Fi module or has the capability of using both the Bluetooth and Wi-Fi protocols, Wi-Fi being intended for connection to the server. The gateway will frequently connect to a Wi-Fi router in the household, the Wi-Fi router then being able to establish a connection to the server by way of one or multiple generally wired networks. The gateways can of course also each have a Bluetooth module and a separate Wi-Fi module. An indication of a quality of the received radio signals is determined by each gateway. The indications thus determined are preferably transferred to the server. One of the gateways is selected on the basis of the indications, for example by the server. A wireless communication connection is then set up between the small household appliance and the selected gateway. The gateway can establish a connection to the server for the small household appliance so that the communication connection, which operates by way of the selected gateway, is set up between the small household appliance and the server.

This allows a small household appliance to connect to a suitable gateway by way of Bluetooth. Said gateway preferably operates not only the Bluetooth protocol but also the Wi-Fi protocol, with the aid of which it can connect to the server. The small household appliance can then also access the server by way of the gateway, possibly in a higher layer, in order thus to be integrated for example in a general smart home system.

A particularly preferred system can comprise a wireless communication interface based on Bluetooth and a further communication interface based on Wi-Fi for connection to a (preferably central) server or on the internet. The gateway can be designed to receive radio signals from a small household appliance based on Bluetooth, determine an indication of a quality of the received radio signals and transfer it to the server. The gateway can receive a request from the server in response to the transferred indication and set up a wireless communication connection to the small household appliance. The gateway can be designed to establish a connection to the server for the small household appliance so that the communication connection, which operates by way of the gateway, is set up between the small household appliance and the server. The gateway can be part of a large household appliance, in particular an oven, cooker, extractor hood, refrigerator, dishwasher or washing machine.

A particularly preferred system can comprise such a small household appliance, one or multiple such gateways, which are each preferably part of a large household appliance, and a central server. The server can be designed to receive indications of the quality of a radio signal received from the small household appliance from each of the gateways and to select one of the gateways on the basis of the indications.

The invention is described in more detail below with reference to the accompanying figures, in which:

DETAILED DESCRIPTION OF THE INVENTION

Figure 1:
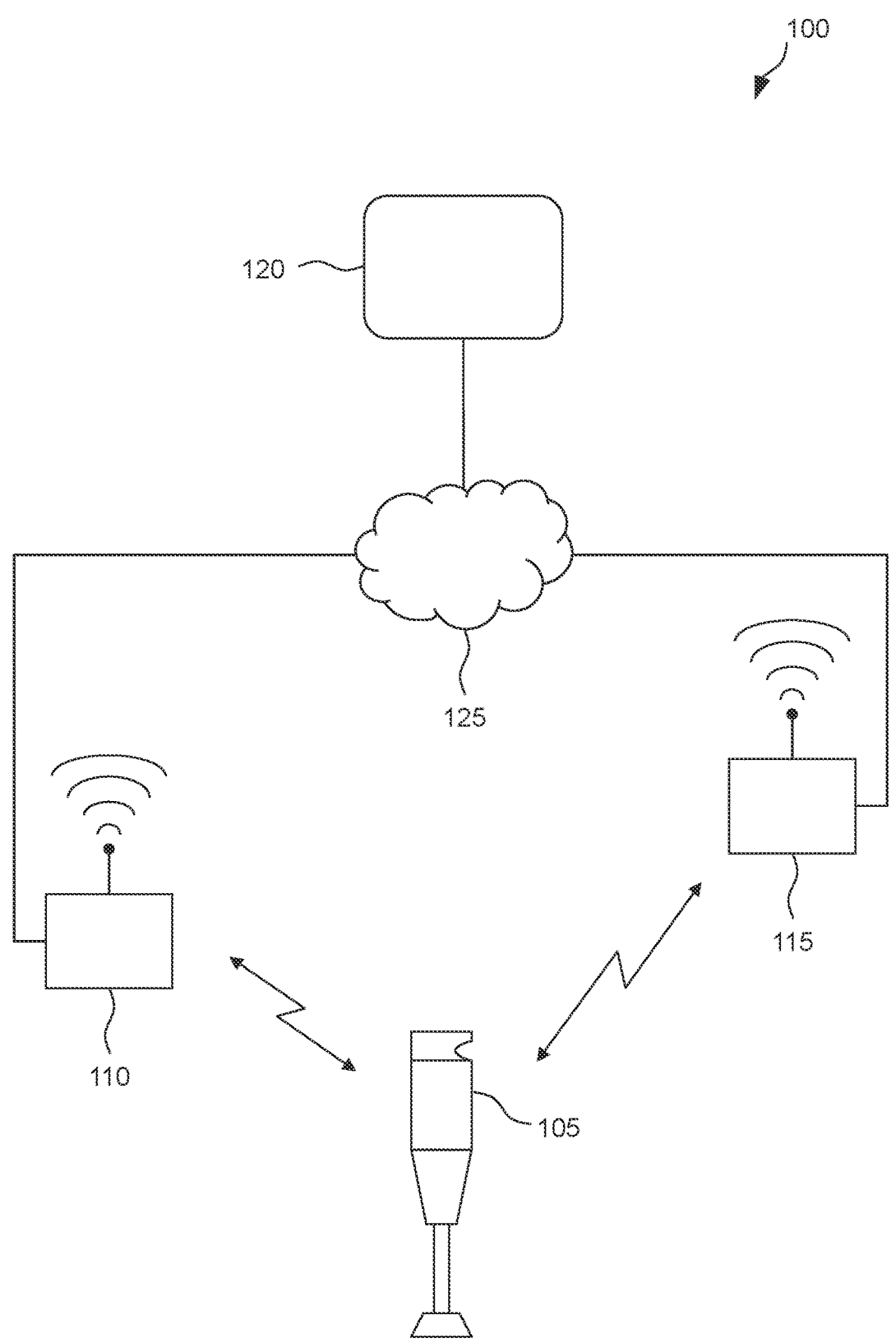
FIG. 1 shows a system comprising a household appliance, multiple gateways and a central location.

FIG. 1 shows a system 100 comprising a household appliance 105, a first gateway 110, a second gateway 115 and a central location 120. The household appliance 105 is shown by way of example as a hand mixer but can in practice comprise any other household appliance 105, for example a tumble dryer, iron or hair dryer. Any plurality of gateways 110, 115 can generally be used for a technique described herein; two gateways 110, 115 are assumed here purely by way of example, the present invention being described on this basis.

The central location 120 and gateways 110, 115 are connected to one another by means of an exemplary network 125. The network 125 can be comprise for example a private network, a company network, a virtual network, a mobile radio network or the internet. The gateways 110, 115 can also communicate with the central location 120 by way of different networks 125.

The household appliance 105 comprises a BTLE interface, by means of which a communication connection can be set up to one of the gateways 110, 115. The household appliance 105 here offers server services, in the same way as headphones can supply the server service of the acoustic provision of audio data to a mobile telephone.

To set up a wireless communication connection to one of the gateways 110, 115 the household appliance 105 can transmit predetermined radio signals, which can be received by the gateways 110, 115. Said radio signals do not necessarily have to be part of the setting up of the connection to the BTLE specification; instead radio signals transmitted by the household appliance 105 for example in the context of advertising or a discovery according to BTLE can be used. Each gateway 110, 115 can determine the quality of the respectively received radio signals or the quality a wireless communication connection can achieve in each instance with the household appliance 105. The quality can be determined using any metric and the metric can be determined in relation to different parameters, for example an analog signal strength, SNR or variance of a parameter over time.

The determined quality can then be forwarded to the central location 120. In a further embodiment determined parameters can also be forwarded unprocessed to the central location 120 on the part of a gateway 110, 115, the central location 120 then being able to determine the quality. The quality is preferably determined so that two quality values can be compared directly with one another to show which gateway 110, 115 can allow a higher quality wireless communication connection to the household appliance 105.

The central location 120 can determined information about the gateways 110, 115, which can also be used as the basis for selecting a gateway 110, 115 for setting up a wireless communication connection to the household appliance 105. For example an average operating time or amount of other communication being handled by the gateways 110, 115 can be evaluated along with the determined quality to select a gateway 110, 115.

The central location 120 can then send a request to establish a wireless communication connection to the selected gateway 110, 115. A gateway 110, 115 that has not been selected can receive a request to the contrary. The selected gateway 110, 115 can then set up the wireless communication connection to the household appliance 105. The established connection can be protected cryptographically in the transport layer. Information can be exchanged between the household appliance 105 and the central location 120 by way of the connection.

Figure 2:
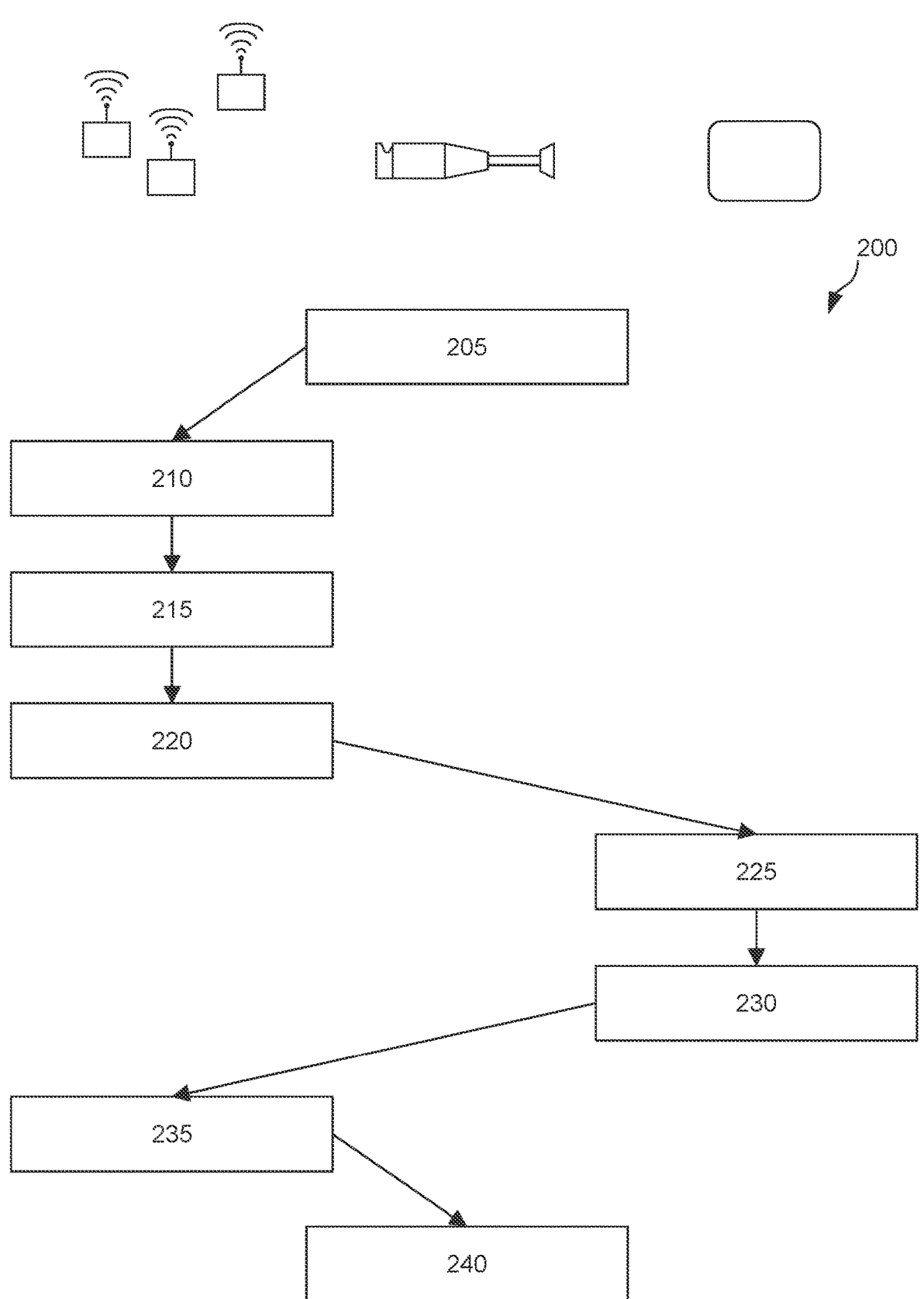
FIG. 2 shows a flow diagram of a method for wireless communication for a household appliance.

FIG. 2 shows a flow diagram of a method 200 for wireless communication for a household appliance 105. A left-hand region shows steps generally performed by a gateway 110, 115. It should be noted that multiple gateways 110, 115 are generally involved in the method 200 so these steps can be performed separately by each of the gateways 110, 115. A central region shows steps generally performed by a household appliance 105 and a right-hand region shows steps generally performed by the central location 120. Some of the steps shown can be performed alternatively or cooperatively by different parties.

In a step 205 the household appliance 105 transmits radio signals, which are received by a gateway 110, 115 in a step 210. The radio signals can be selected specifically to assess an evaluation of the quality of a wireless connection. For example the signals can follow a predetermined pattern, predetermined frequencies or frequency bands can be used, predetermined information can be transferred and a predetermined modulation can take place. These signals are not necessarily part of a later setting up of a wireless connection between the household appliance 105 and a gateway 110, 115.

In a step 215 a gateway 110, 115 determines the quality of the radio signals or the quality of a communication connection that can be established in each instance to the household appliance 105. Parameters of a bit transfer layer in particular can be considered here. An error rate when transferring information by means of the radio signal can also optionally be considered. The error rate can be determined for example by means of a checksum method such as CRC or in relation to transferred information known previously on the part of the gateway 110, 115.

In a step 220 a gateway 110, 115 can determine communication parameters which, in addition to the determined quality, can comprise information indicating the respective gateway 110, 115 or an operating parameter. Such information can comprise for example a site, an assignment to a household, task capacity utilization, characteristics of a communication connection to the central location 120 such as latency time or bandwidth, as well as costs associated with a communication or reliability. The communication parameters can then be transferred to the central location 120.

In a step 225 the central location 120 can use received communication parameters to select a gateway 110, 115 by way of which a sufficiently good communication connection can probably be established. The wireless communication connection between the household appliance 105 and the gateway 110, 115 can also be taken into account here, as can the communication connection between the gateway 110, 115 and the central location 120.

In a step 230 the selected gateway 110, 115 can be prompted to establish the wireless connection. Gateways 110, 115 that have not been selected can be prompted not to establish a wireless connection, to terminate an existing wireless connection and/or to interfere as little as possible with a wireless connection to the selected gateway 110, 115.

In a step 235 the wireless communication connection can be set up between the selected gateway 110, 115 and the household appliance 105. In a step 240 communication between the household appliance 105 and the central location 120 can also be protected cryptographically. End to end encryption in particular can be used here, being set up on the established transport connection between the central location 120 and the household appliance 105.

The method 200 can operate cyclically so that the gateway 110, 115 used for communication between the household appliance 105 and the central location 120 can be switched dynamically. A switch can be transparent for communication between the household appliance 105 and the central location 120.

REFERENCE CHARACTERS

10 System
105 Household appliance
110 First gateway
115 Second gateway
120 Central location
125 Network
200 Method
205 Transmit signal
210 Receive signal
215 Determine connection quality
220 Determine communication parameters 225 Determine preferred gateway
230 Inform gateways
235 Set up communication
240 Encrypt communication

The invention claimed is:

1. A method for wireless communication of a small household appliance with a central location on the internet, the method comprising:
   transmitting radio signals from the small household appliance using Bluetooth®;
   receiving the transmitted radio signals by multiple gateways, each gateway being part of a large household appliance and each having a combined Bluetooth® and Wi-Fi module, and Wi-Fi being intended for connection to the central location on the Internet;
   determining an indication of a quality of the received radio signals by each gateway;
   transmitting the indications of quality to the central location;
   selecting one of the gateways to determine a selected gateway based of the indications of quality; and
   establishing a wireless communication connection between the small household appliance and the selected gateway, the selected gateway establishing a connection to the central location, such that the small household appliance can access the central location via the selected gateway.

2. The method according to claim 1, which comprises setting up a communication connection that operates by way of the selected gateway between the household appliance and the central location.

3. The method according to claim 2, which comprises communicating between the household appliance and the central location via an encrypted communication connection.

4. The method according to claim 1, which comprises also determining the selected gateway by the central location on a basis of information relating to the gateways.

5. The method according to claim 1, wherein the gateways continue to receive radio signals from the household appliance, determine an indication of a quality of the radio signals, and forward the determined indication of the quality to the central location.

6. The method according to claim 5, which comprises:
   selecting by the central location another gateway based on the received indications of quality;
   terminating an existing wireless communication connection and
   setting up a wireless communication connection with the other gateway.

7. The method according to claim 1, which comprises using a stateless protocol between the household appliance and the central location.

8. The method according to claim 1, wherein the wireless communication connection between the household appliance and the gateway is a Bluetooth communication connection.

9. A gateway on a large household appliance, comprising:
   a combined Bluetooth® and Wi-Fi module including a wireless communication interface based on Bluetooth® and a further Wi-Fi communication interface for connection to a central location on the internet;
   the gateway being configured:
   to receive radio signals from a small household appliance via Bluetooth®;

to determine an indication of a quality of the received radio signals and transfer the indication of quality to the central location;

to receive a request from the central location in response to the transferred indication of quality; and to set up a wireless communication connection to the small household appliance and establishing a connection to the central location, such that the small household appliance can access the central location via the gateway.

10. A household appliance, comprising a gateway according to claim 9.

11. The household appliance according to claim 10, being a large household appliance selected from the group consisting of an oven, a stove, an extractor hood, a refrigerator, a dishwasher, and a washing machine.

12. A system, comprising:

a household appliance which is configured to transmit and receive radio signals;

one or a plurality of gateways according to claim 9; and a central location, which is configured to receive from the gateway or gateways indications of a quality of a radio signal received by each gateway from the household appliance and to select one of the gateways on a basis of the indications.

\* \* \* \* \*